(12) United States Patent
Fair et al.

(10) Patent No.: US 9,524,073 B1
(45) Date of Patent: Dec. 20, 2016

(54) TRIGGERING ACTION ON A WEB PAGE

(71) Applicant: Google Inc., Mountain View, CA (US)

(72) Inventors: Gregory L. Fair, Los Altos Hills, CA (US); James K. Rodgers, Mountain View, CA (US); Mark E. Doliner, Sunnyvale, CA (US); David E. Barnett, Mountain View, CA (US); Kevin T. Irish, Mountain View, CA (US); Brendan W. O'Brien, Mountain View, CA (US)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 13/892,413

(22) Filed: May 13, 2013

(51) Int. Cl.
*G06F 3/00* (2006.01)
*G06F 3/0481* (2013.01)
*G06F 17/30* (2006.01)

(52) U.S. Cl.
CPC ......... *G06F 3/0481* (2013.01); *G06F 17/3089* (2013.01)

(58) Field of Classification Search
CPC ......... G06F 17/227; G06F 17/3089–17/30896; G06F 17/3092; G06F 17/30905; G06F 3/048; G06F 3/0481; G06F 3/0482; G06F 3/0484; G06F 3/1243; G06Q 30/0251; G06Q 30/0253
USPC .............................. 715/234, 760; 705/14.73
See application file for complete search history.

(56) References Cited

U.S. PATENT DOCUMENTS

| | | | |
|---|---|---|---|
| 2007/0180360 A1* | 8/2007 | Neil | 715/513 |
| 2010/0114720 A1* | 5/2010 | Jones et al. | 705/14.73 |
| 2011/0078775 A1* | 3/2011 | Yan | G06F 21/57 726/6 |
| 2013/0117675 A1* | 5/2013 | Twig et al. | 715/737 |

* cited by examiner

Primary Examiner — Haoshian Shih

(57) ABSTRACT

A method and computer system for receiving a selection of a first element of one or more elements on a web page via a user interface. A selection of an action to associate with the first element is received via the user interface. The action is associated with the first element on the web page based upon, at least in part, receiving the selection of the action.

20 Claims, 5 Drawing Sheets

500 `<script type="text/javascript" src="https://apis.mysite.com/js/feature.js?possible_unique_identifier"></script>`

FIG. 5

TRIGGERING ACTION ON A WEB PAGE

BACKGROUND

Generally, to display a new feature to a user or update an existing feature, a publisher must decide the criteria used to display the feature and add the code to their website or application to trigger the feature. They must then add code to their website or application to create or update the features that will be displayed. This may require modifying, testing, and releasing the website or application, which may cause delays of, e.g., days, weeks, and even months before changes may be implemented, tested, and deployed to production. This may be particularly true for websites or applications with, e.g., long release cycles or that employ third-party developers. Moreover, publishers of some websites or applications may not want to display the same features on every page, or to every visitor on the web site. For example, if the webpage template structure is robust, the publisher may be able to implement features on a per-page basis keyed off of the dimension that may be of interest to them (e.g., author name, content category, etc.), but even in those cases it may require the developer to directly add new code to the template(s) and a new product release.

BRIEF SUMMARY OF DISCLOSURE

In one implementation, a method, performed by one or more computing devices, comprises populating, on a computing device, a user interface dashboard with one or more elements on a web page based upon, at least in part, existing code on the web page. A selection of a first element of the one or more elements may be received via the user interface dashboard, wherein selection of the first element may include at least one of a class name and an element ID populated in the user interface dashboard. A selection of an action to associate with the first element may be received via the user interface dashboard. The action may be associated with the first element based upon, at least in part, receiving the selection of the action.

In one implementation, a method, performed by one or more computing devices, comprises receiving a selection of a first element of one or more elements on a web page via a user interface. A selection of an action to associate with the first element may be received via the user interface. The action may be associated with the first element on the web page based upon, at least in part, receiving the selection of the action.

One or more of the following features may be included. The user interface may include a dashboard. The user interface may be populated with the one or more elements based upon, at least in part, existing code on the web page. Selection of the first element may include a query selector. Selection of the first element may include an element ID of existing code on the web page for the first element. Selection of the first element may include a location of the action. The action may include a content notification. The action may include an in-page content recommendation. The action may be executed when the first element is displayed. Selection of the first element may include a user action associated with the first element.

In another implementation, a computing system includes a processor and a memory configured to perform operations comprising receiving a selection of a first element of one or more elements on a web page via a user interface. A selection of an action to associate with the first element may be received via the user interface. The action may be associated with the first element on the web page based upon, at least in part, receiving the selection of the action.

One or more of the following features may be included. The user interface may include a dashboard. The user interface may be populated with the one or more elements based upon, at least in part, existing code on the web page. Selection of the first element may include a query selector. Selection of the first element may include an element ID of existing code on the web page for the first element. Selection of the first element may include a location of the action. The action may include a content notification. The action may include an in-page content recommendation. The action may be executed when the first element is displayed. Selection of the first element may include a user action associated with the first element.

The details of one or more implementations are set forth in the accompanying drawings and the description below. Other features and advantages will become apparent from the description, the drawings, and the claims.

BRIEF DESCRIPTION OF THE DRAWINGS

FIG. 5 is an illustrative example code that may be used according to one or more implementations of the present disclosure.

Like reference symbols in the various drawings indicate like elements.

DETAILED DESCRIPTION

In some implementations, as will be discussed in greater detail below, instead of inserting code snippets with pre-defined tags that publishers may be required to add into a web site in the appropriate location on a web page, and then scanning the web page and looking for those pre-defined tags, action process 10 may enable the publisher to identify existing elements on the web page, indicate which existing elements on the web page that the publisher wants to use, and then those elements may be the triggers to perform certain actions.

Figure 1:
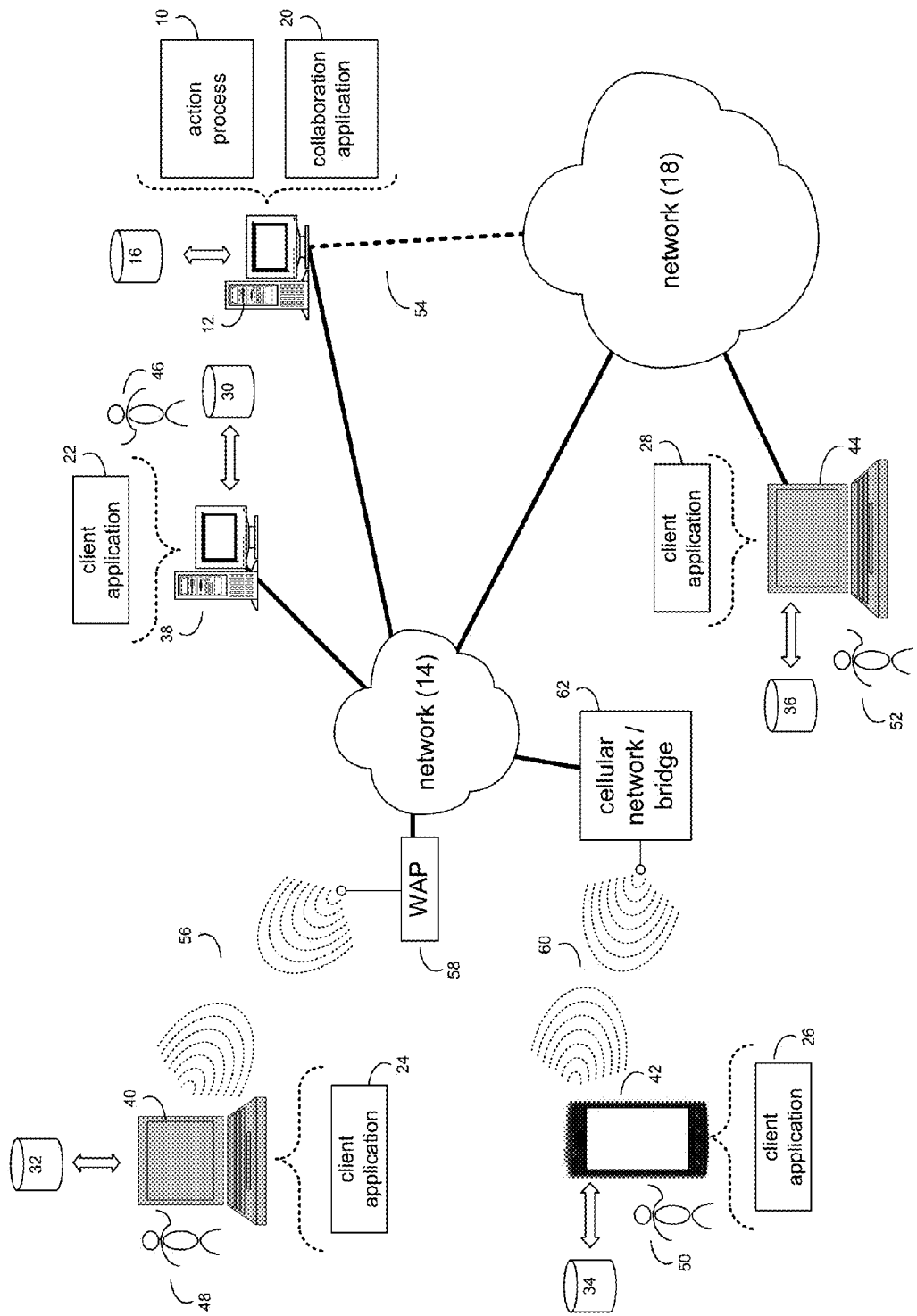
FIG. 1 is an illustrative diagrammatic view of an action process coupled to a distributed computing network according to one or more implementations of the present disclosure.

Referring to FIG. 1, there is shown action process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, action process 10 may receive a selection of a first element of one or more elements on a web page via a user interface. A selection of an action to associate with the first element may be received via the user interface. The action may be associated with the first element on the web page based upon, at least in part, receiving the selection of the action.

The instruction sets and subroutines of action process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Action process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a web site application (e.g., web site application 20), examples of which may include, but are not limited to, e.g., a web server application, web site building application, a web site management application, a web site hosting application, or other application that allows for the building, execution, administration, and management of a web site and/or its associated content. Action process 10 and/or web site application 20 may be accessed via client applications 22, 24, 26, 28. Action process 10 may be a stand alone application, or may be an applet/application/script that may interact with and/or be executed within web site application 20 and/or one or more of client applications 22, 24, 26, 28. Web site application 20 may be a stand alone application, or may be an applet/application/script that may interact with and/or be executed within action process 10 and/or one or more of client applications 22, 24, 26, 28. One or more of client applications 22, 24, 26, 28 may be a stand alone application, or may be an applet/application/script that may interact with and/or be executed within action process 10 and/or web site application 20. Examples of client applications 22, 24, 26, 28 may include, but are not limited to, e.g., a web server application, web site building application, a web site management application, a web site hosting application, or other application that allows for the building, execution, administration, and management of a web site and/or its associated content, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of action process 10 (and vice versa). Accordingly, action process 10 may be a purely server-side application, a purely client-side application, or a hybrid server-side/client-side application that is cooperatively executed by one or more of client applications 22, 24, 26, 28 and/or action process 10.

One or more of client applications 22, 24, 26, 28 may be configured to effectuate some or all of the functionality of web site application 20 (and vice versa). Accordingly, web site application 20 may be a purely server-side application, a purely client-side application, or a hybrid server-side/client-side application that is cooperatively executed by one or more of client applications 22, 24, 26, 28 and/or web site application 20. As one or more of client applications 22, 24, 26, 28, action process 10, and web site application 20, taken singly or in any combination, may effectuate some or all of the same functionality, any description of effectuating such functionality via one or more of client applications 22, 24, 26, 28, action process 10, web site application 20, or combination thereof, and any described interaction(s) between one or more of client applications 22, 24, 26, 28, action process 10, web site application 20, or combination thereof to effectuate such functionality, should be taken as an example only and not to limit the scope of the disclosure.

Users 46, 48, 50, 52 may access computer 12 and action process 10 (e.g., using one or more of client electronic devices 38, 40, 42, 44) directly through network 14 or through secondary network 18. Further, computer 12 may be connected to network 14 through secondary network 18, as illustrated with phantom link line 54. Action process 10 may include one or more user interfaces, such as browsers and textual or graphical user interfaces, through which users 46, 48, 50, 52 may access action process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
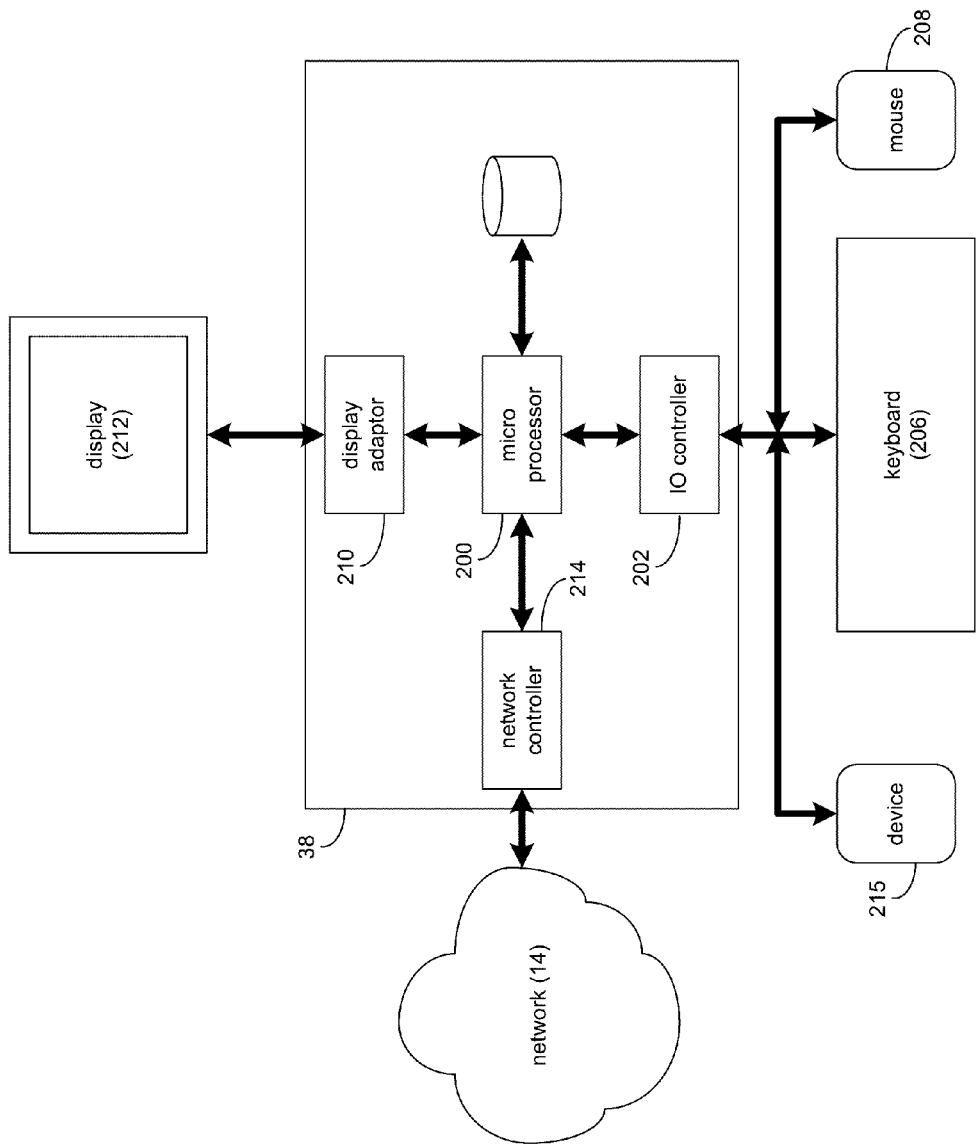
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, action process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
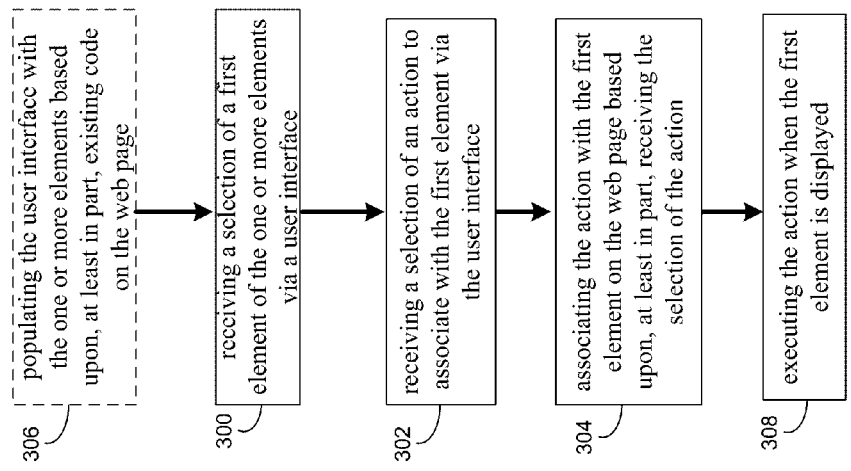
FIG. 3 is an illustrative flowchart of the action process of FIG. 1 according to one or more implementations of the present disclosure.

As discussed above and referring also to FIGS. 3-4, action process 10 may receive 300 a selection of a first element of one or more elements on a web page via a user interface. A selection of an action to associate with the first element may be received 302 by action process 10 via the user interface. The action may be associated 304 with the first element on the web page by action process 10 based upon, at least in part, receiving 302 the selection of the action.

Generally, using embedded social media platforms as an example only, a snippet of, e.g., Javascript, may be manually added to a website, which then causes a widget (e.g., a "like" icon) to be loaded and displayed as an overlay on the website. Typically, without additional script tags (or the like) manually added on the web page, the widget is limited in its ability to interact with the web page. Therefore, the user interface may display the widget only as an overlay on the existing website (e.g., a fixed position bar on bottom, top or side of a browser) and may be "keyed off" (e.g., triggered for execution) based upon user actions and generic web page properties (e.g., % of page scroll, number of pixels scrolled, time delay, user upscroll, etc.). To key off of a specific place on the web page (e.g., at the bottom of a web page article), the widget may require the manual addition of script tags at that specific location, e.g., in the Document Object Model (DOM), so it is known when to be displayed.

Other example services may scan the web page to look for specific elements (e.g., images, videos, links, etc.) on the web page. The service may then modify those specific page elements to incorporate some additional feature (e.g., sharing, saving, related content, advertising, etc.). The service may then key off of known object/element types to decide which objects to modify, and generally may allow for publishers to override those settings manually with the addition of content tags. Other example services may move content around within the web page to optimize object display and placement, but this may require deep website integration and significant up-front development effort.

Action process 10 may enable users (e.g., publishers) to enable, disable, and configure website features in virtual real-time without manually adding the above-noted example code (e.g., scripts, content tags, etc.) to their website, and with the same or similar granularity of control with regards to where/when actions occur on the web page that the publisher may have as if, e.g., they were manually adding the code to their website. For instance, assume for example purposes only that a user (e.g., user 46) is a website publisher that wants to add functionality (e.g., a recommended content notification) to a web page that is meant to display when a user reaches the end of an article on the web page. Typically, as noted above, user 46 may be required to add a script tag at the bottom of the article in the website template. However, the website may already have code that identifies where the end of the article is. For instance, this may be the bottom of the <div id="article-body"> tag on their page, or may be at the beginning of the <div class="comments"> section on the web page. As such, in the example, action process 10 may use the existing code on the web site, and then use that as the trigger to take action.

Figure 4:
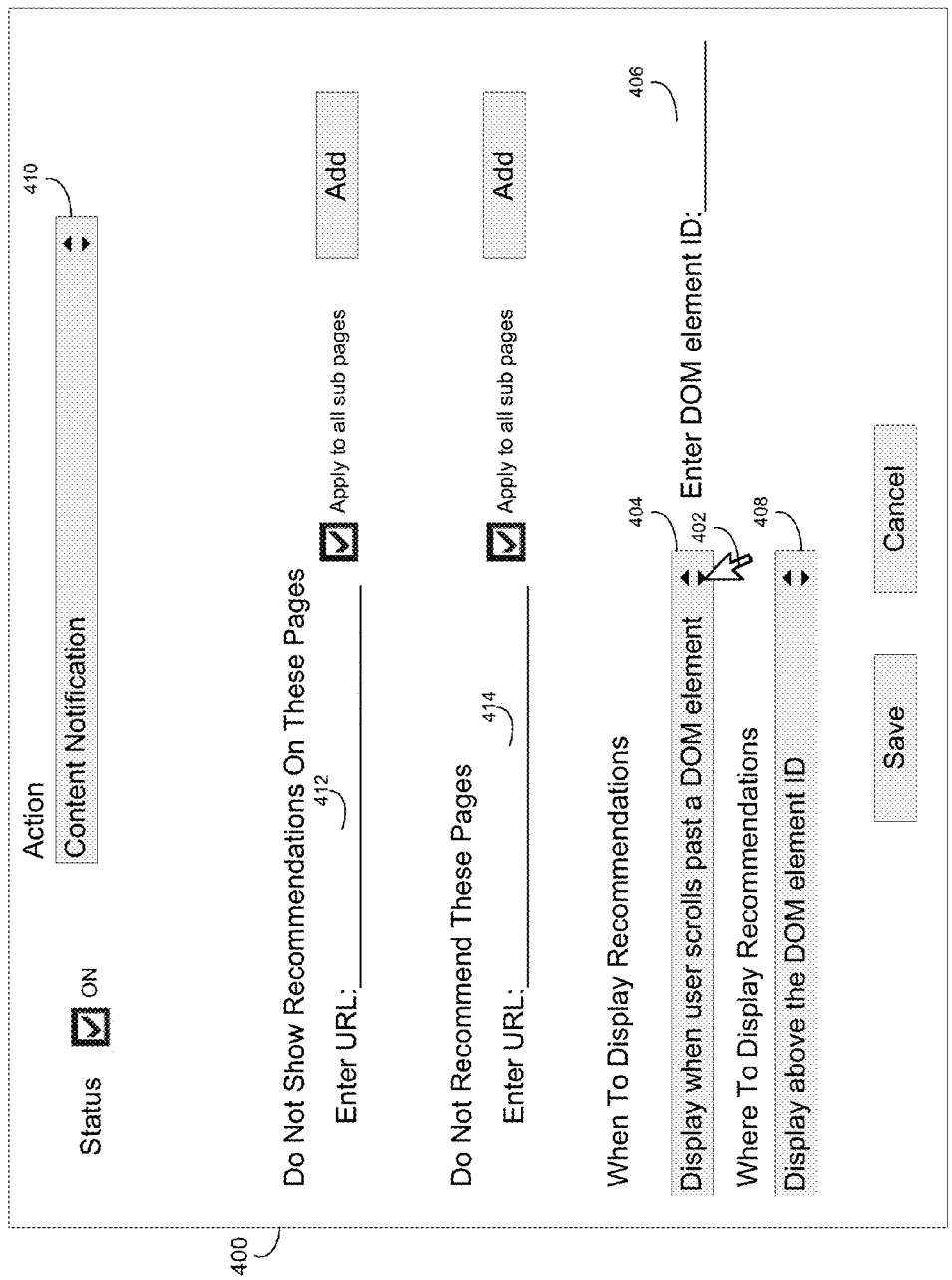
FIG. 4 is an illustrative diagrammatic view of a screen image displayed by the action process of FIG. 1 according to one or more implementations of the present disclosure.

For example, action process 10 may receive 300 a selection of a first element of one or more elements on a web page via a user interface. In some implementations, the user interface may include a dashboard. Referring at least to FIG. 4, an example user interface dashboard (e.g., dashboard 400) associated with, e.g., action process 10, website application 20, client application 22, or combination thereof, is shown. In some implementations, dashboard 400 may include a cloud configuration panel for website widgets (e.g., content notifications, in-page content recommendation boxes, sharing, saving, advertising, etc.). In the example, action process 10 may enable user 46 to use, e.g., cursor 402 via mouse 208, to input the first element to be received 300. For instance, selection of the first element may include an element ID of existing code on the web page for the first element. In the example, action process 10 may enable user 46 to use cursor 402 to select, e.g., object 404, where an example dropdown menu may be used to select a particular element from existing code on the web page. Action process 10 may enable user 46 to use cursor 402 to then select, e.g., object 406, where user 46 may input the element ID (e.g., of the article), such as <div id="article-body">. While an element ID is described, other examples of elements may also be used without departing from the scope of the disclosure. For example, selection of the first element may include a class name of existing code on the web page for the first element. An example of the class name may include, e.g., the above-noted <div class="comments">. Additionally, in some implementations, selection of the first element may include a query selector. A query selector may generally be described as a more generic way of identifying the first element. For example, a query selector may represent the above-noted element ID, the above-noted class name, or other more detailed specifiers. As such, the use of an element ID and/or class name should be taken as an example only and not to limit the scope of the disclosure.

In some implementations, selection of the first element may include a location of the action. In the example, action process 10 may enable user 46 to use cursor 402 to select, e.g., object 408, where an example dropdown menu may be used to select a particular location where the recommended content notification is to be displayed. For instance, action process 10 may enable user 46 to have the recommended content notification be displayed, e.g., above the DOM element ID entered via object 406, below the DOM element ID entered via object 406, left of the DOM element ID entered via object 406, right of the DOM element ID entered via object 406, etc.

In some implementations, action process 10 may populate 306 the user interface with the one or more elements based upon, at least in part, existing code on the web page. For instance, assume for example purposes only that the code for the web page is stored (e.g., at storage device 30). Action process 10 may query client electronic device 38 to retrieve the code for the web page from storage device 30 and populate, e.g., object 404, with each element from that code. In some implementations, action process 10 may populate 306 the user interface (e.g., dashboard 400) with any previously entered elements, such as the above-noted DOM element ID entered via object 406.

In some implementations, a selection of an action to associate with the first element may be received 302 by action process 10 via the user interface. For example, as noted above, the action may include a content notification. For instance, a content notification may include, e.g., a notification that a comment has been left by a user about the article on the web page or a comment about another web page. In the example, action process 10 may enable user 46 to use cursor 402 to select, e.g., object 410, where an example dropdown menu may be used to select a particular action to associate with the first element (e.g., the DOM element ID entered via object 406). Other examples of content notification may also be used without departing from the scope of the disclosure. While examples of content notifications are described, other actions may also be used without departing from the scope of the disclosure. For example, the action may include an in-page content recommendation. The in-page content recommendation (box) may include, e.g., a related article with a similar topic as the above-noted article on the web page. As another example, the action may include tagging articles with category labels. For example, dashboard 400 may enable user 46 to select (as the action via object 410) a restaurant reservation widget that is to be displayed on articles tagged with "restaurants".

As such, the description of content notifications and/or in-page content recommendations (as well as any other website widgets) should be taken as an example only and not to limit the scope of the disclosure.

In some implementations, the action may be associated 304 with the first element on the web page by action process 10 based upon, at least in part, receiving 304 the selection of the action. For example, action process 10 may execute 308 the action when the first element is displayed. For instance, as noted above, assume for example purposes only that user 46 wants to add functionality (e.g., a recommended content notification) to a web page that is meant to display below an article of the web page when a user reaches the bottom of the article. In the example, action process 10 may enable user 46 to use cursor 402 to select, e.g., object 404, where an example dropdown menu may be used to select the <div id="article-body"> tag as the particular element from existing code on the web page. Further in the example, action process 10 may enable user 46 to use cursor 402 to select, e.g., object 408, where an example dropdown menu may be used to select the particular location of below the <div id="article-body"> entered via object 406 where the recommended content notification is to be displayed. Further in the example, action process 10 may enable user 46 to use cursor 402 to select, e.g., object 410, where an example dropdown menu may be used to select the content notification action to associate with the <div id="article-body"> entered via object 406. As such, in the example, once the bottom of the article is visibly displayed (e.g., via display 212) as indicated by the <div id="article-body"> tag, action process 10 may execute 308 the action of displaying the recommended content notification below the article.

In some implementations, selection of the first element may include a user action associated with the first element. For example, object 404 currently indicates that the recommended content notification should be displayed when a user scrolls past a particular DOM element ID. In some implementations, object 404 may indicate that the recommended content notification should be displayed when a user hovers cursor 402 over the particular DOM element ID. In the example, if a user hovers cursor 402 over the particular DOM element ID, the recommended content notification may be displayed. Conversely, if a user does not hover cursor 402 over the particular DOM element ID, the recommended content notification may not display, even if the particular DOM element ID is visibly displayed. Other examples of user actions, as well as web page properties (e.g., time delay, number of pixels scrolled, etc.) may also be used without departing from the scope of the disclosure.

In some implementations, dashboard 400 may be used to exclude execution of the action on particular web pages (as well as sub pages). For instance, in the above example, if a user hovers cursor 402 over the particular DOM element ID, the recommended content notification may be displayed if the particular web page (listed at, e.g., object 412) that includes the particular DOM element ID is not listed. Conversely, if a user hovers cursor 402 over the particular DOM element ID, the recommended content notification may not display if the particular web page that includes the particular DOM element ID is listed. In some implementations, dashboard 400 may be used to exclude any recommendations from particular web pages (listed at, e.g., object 414). For instance, in the above example, if a user hovers cursor 402 over the particular DOM element ID, the recommended content notification may be displayed if the particular page to be recommended (listed at, e.g., object 414) is not listed. Conversely, if a user hovers cursor 402 over the particular DOM element ID, the recommended content notification may not display if the particular page to be recommended is listed at object 414.

In some implementations, action process 10 may enable easier A/B testing for multiple concurrent experiments (e.g., to see which text, image, or layout get the best results) partially and/or entirely from the cloud. For example, user 46 may test whether placement of the above-noted content recommendation action (module) is most effectively placed above the article, below the article, or below the comments. Action process 10 may, in some implementations, monitor the experiments in real-time and may optimize the location based on data being read as a result of the experiments.

In some implementations, action process 10 may enable an easier way to implement and configure new site features for, e.g., non-technical users. For larger website publishers, action process 10 may help free them from being tied to existing release schedules and/or getting additional work from engineering teams or third-party developers. In some implementations, user 46 may include in the website a "one-time setup code" 500 (shown by example only at FIG. 5) may enable action process 10 to operate as described throughout. Once setup code 500 is in place, no more developer work is needed to make changes.

While the above description includes examples of "trigger types" such as location on a web page, a user action, and URL, it will be appreciated that other types of triggers may be used without departing from the scope of the disclosure. For example, the triggers may include but are not limited to browser or device type, geo-location, user profile info, how the user arrived on the publisher site, the content or content types of the page, or combination thereof. As such, the description of any particular trigger type should be taken as an example only and not to otherwise limit the scope of the disclosure.

In some implementations, the above-noted functionalities may be mapped by action process 10 to the specific trigger. These may include, e.g., different user interfaces (e.g., a recommended content pull tab for index pages, a sharing bar for articles, and a "watch later" icon on top of videos, etc.). They may also be changing the behavior (e.g., users who do not engage with content notifications may be delivered information via an inline widget; a widget used in conjunction with an event (e.g., a video event) may be displayed to the user only the pages that are relevant and what is displayed may depend on the status of the event (e.g., invitation to RSVP before the event starts, features for contributing after one RSVPs, participate in the event when the event is live, and/or review the event after the event is completed); a user who comes to a restaurant menu page after searching for e.g., "restaurants with good vegan food in San Mateo" may see the vegan menu items highlighted or aggregated for easier viewing.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   populating, on a computing device, a user interface dashboard with one or more elements on a web page based upon, at least in part, existing code on the web page;
   receiving a selection of a first element of the one or more elements via the user interface dashboard, wherein the selection of the first element includes a location of an action in the web page, wherein the action includes a content notification to be displayed at the location of the action in the web page,
     wherein the content notification is to be displayed if the web page is excluded from a first list that specifies web pages on which to not show content notifications,
     wherein the content notification includes a particular page that is absent from a second list of pages to exclude from notification, and
     wherein selection of the first element includes at least one of a class name and an element ID populated in the user interface dashboard;
   receiving a selection of the action to associate with the first element via the user interface dashboard; and
   associating the action with the first element based upon, at least in part, receiving the selection of the action.

2. A computer-implemented method comprising:
   receiving, by a computing device, a selection of a first element of one or more elements on a web page via a user interface, wherein selection of the first element includes a location of an action in the web page and wherein the action includes a content notification to be displayed at the location of the action in the web page,
     wherein the content notification is to be displayed if the web page is excluded from a first list that specifies web pages on which to not show content notifications, and
     wherein the content notification includes a particular page that is absent from a second list of pages to exclude from notification;
   receiving a selection of the action to associate with the first element via the user interface; and
   associating the action with the first element on the web page based upon, at least in part, receiving the selection of the action.

3. The computer-implemented method of claim 2 wherein the user interface includes a dashboard.

4. The computer-implemented method of claim 2 wherein selection of the first element includes a query selector.

5. The computer-implemented method of claim 2 wherein selection of the first element includes an element ID of existing code on the web page for the first element.

6. The computer-implemented method of claim 2 wherein the location of the action in the web page is one or more of: above the first element, below the first element, left of the first element, and right of the first element.

7. The computer-implemented method of claim 2 wherein the action includes an in-page content recommendation.

8. The computer-implemented method of claim 2 further comprising populating the user interface with the one or more elements based upon, at least in part, existing code on the web page.

9. The computer-implemented method of claim 2 further comprising executing the action when the first element is displayed.

10. The computer-implemented method of claim 9 wherein selection of the first element includes a user action associated with the first element.

11. A computing system including a processor and a memory configured to perform operations comprising:
    receiving, by a computing device, a selection of a first element of one or more elements on a web page via a user interface, wherein selection of the first element includes a location of an action in the web page and wherein the action includes a content notification to be displayed at the location of the action in the web page, wherein the content notification is to be displayed if the web page is excluded from a first list that specifies web pages on which to not show content notifications, and
    wherein the content notification includes a particular page that is absent from a second list of pages to exclude from notification;
    receiving a selection of the action to associate with the first element via the user interface; and
    associating the action with the first element on the web page based upon, at least in part, receiving the selection of the action.

12. The computing system of claim 11 wherein the user interface includes a dashboard.

13. The computing system of claim 11 wherein selection of the first element includes a query selector.

14. The computing system of claim 11 wherein selection of the first element includes an element ID of existing code on the web page for the first element.

15. The computing system of claim 11 wherein the location of the action in the web page is one or more of: above the first element, below the first element, left of the first element, and right of the first element.

16. The computing system of claim 11 wherein the action includes an in-page content recommendation.

17. The computing system of claim 11 further comprising populating the user interface with the one or more elements based upon, at least in part, existing code on the web page.

18. The computing system of claim 11 further comprising executing the action when the first element is displayed.

19. The computing system of claim 18 wherein selection of the first element includes a user action associated with the first element.

20. The computer-implemented method of claim 2 wherein the location of the action in the web page is with reference to the first element.

* * * * *